US012269442B2

(12) United States Patent
Haibara et al.

(10) Patent No.: US 12,269,442 B2
(45) Date of Patent: Apr. 8, 2025

(54) CARWASH DEVICE, CAR-WASHING METHOD, STORAGE MEDIUM STORED WITH CAR-WASHING PROGRAM, AND CAR-WASHING SYSTEM

(71) Applicant: TOYOTA JIDOSHA KABUSHIKI KAISHA, Aichi-ken (JP)

(72) Inventors: Teruaki Haibara, Kanagawa-ken (JP); Kenji Hoshi, Gotemba (JP); Masaaki Sato, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 364 days.

(21) Appl. No.: 17/808,541

(22) Filed: Jun. 24, 2022

(65) Prior Publication Data

US 2022/0410849 A1 Dec. 29, 2022

(30) Foreign Application Priority Data

Jun. 28, 2021 (JP) .................. 2021-107108

(51) Int. Cl.
*B60S 3/06* (2006.01)

(52) U.S. Cl.
CPC ...................... *B60S 3/06* (2013.01)

(58) Field of Classification Search
CPC ......... B60S 1/0844; B60S 3/06; G06Q 50/10; G01C 21/34; G05D 1/02
USPC .................................................. 15/45
See application file for complete search history.

(56) References Cited

FOREIGN PATENT DOCUMENTS

| CN | 109131251 A | * | 1/2019 | ............... B60S 3/04 |
|---|---|---|---|---|
| JP | H04-129864 A | | 4/1992 | |
| JP | H10-129431 A | | 5/1998 | |
| JP | 2001-026259 A | | 1/2001 | |
| JP | 2002-211368 A | | 7/2002 | |
| JP | 2007-331497 A | | 12/2007 | |
| JP | 2011-121546 A | | 6/2011 | |

\* cited by examiner

*Primary Examiner* — Katina N. Henson
(74) *Attorney, Agent, or Firm* — HAUPTMAN HAM, LLP (57) ABSTRACT

A carwash device receives vehicle attribute information indicating an attribute of a vehicle that is a car-washing target. The carwash device selects a car-washing mode based on the vehicle attribute information, and the carwash device drives a drive section for washing the vehicle such that the vehicle is washed in the selected car-washing mode.

14 Claims, 7 Drawing Sheets

| AUTONOMOUS VEHICLE? | SHAPE | PAINT | COATING | EQUIPMENT | ROBUSTNESS | CAR-WASHING MODE |
|---|---|---|---|---|---|---|
| ... | ... | ... | ... | ... | ... | CAR-WASHING MODE 1 |
| ... | ... | ... | ... | ... | ... | CAR-WASHING MODE 2 |
| ... | ... | ... | ... | ... | ... | ... |

CARWASH DEVICE, CAR-WASHING METHOD, STORAGE MEDIUM STORED WITH CAR-WASHING PROGRAM, AND CAR-WASHING SYSTEM

CROSS-REFERENCE TO RELATED APPLICATION

This application is based on and claims priority under 35 USC 119 from Japanese Patent Application No. 2021-107108 filed on Jun. 28, 2021, the disclosure of which is incorporated by reference herein.

BACKGROUND

Technical Field

The present disclosure relates to a carwash device, a car-washing method, a storage medium stored with a car-washing program, and a car-washing system.

Related Art

Japanese Patent Application Laid-Open (JP-A) No. 2011-121546 discloses a carwash unit drive system that enables precise car-washing corresponding to an external shape and various equipment of a cleaning target vehicle. This carwash unit drive system includes a first car-washing program suited to an external shape of a specific vehicle type, and a second car-washing program suited to an external shape of the vehicle as recognized by a vehicle external shape recognition unit. Car-washing is performed according to the first car-washing program In cases in which a determination section determines that the recognized vehicle external shape matches the external shape of the preset specific vehicle type, whereas car-washing is performed according to the second car-washing program in cases in which the determination section determines that the recognized vehicle external shape does not match the external shape of the preset specific vehicle type.

In the technology disclosed in JP-A No. 2011-121546, the car-washing of the first car-washing program is performed according to the external shape of the specific vehicle type, whereas the car-washing of the second car-washing program is performed in cases in which a determination is made that the vehicle external shape recognized by the vehicle external shape recognition unit does not match the external shape of the preset specific vehicle type. Thus, even in cases in which the vehicle includes different optional equipment to the standard equipment, car-washing can be reliably performed in a sufficiently safe manner without missing any areas where possible.

However, even in cases in which car-washing is executed taking the vehicle external shape into consideration by employing a vehicle external shape recognition unit (a "transmission-type photoelectric sensor" is employed in JP-A No. 2011-121546), the car-washing may not be suitable for the vehicle.

Figure 7:
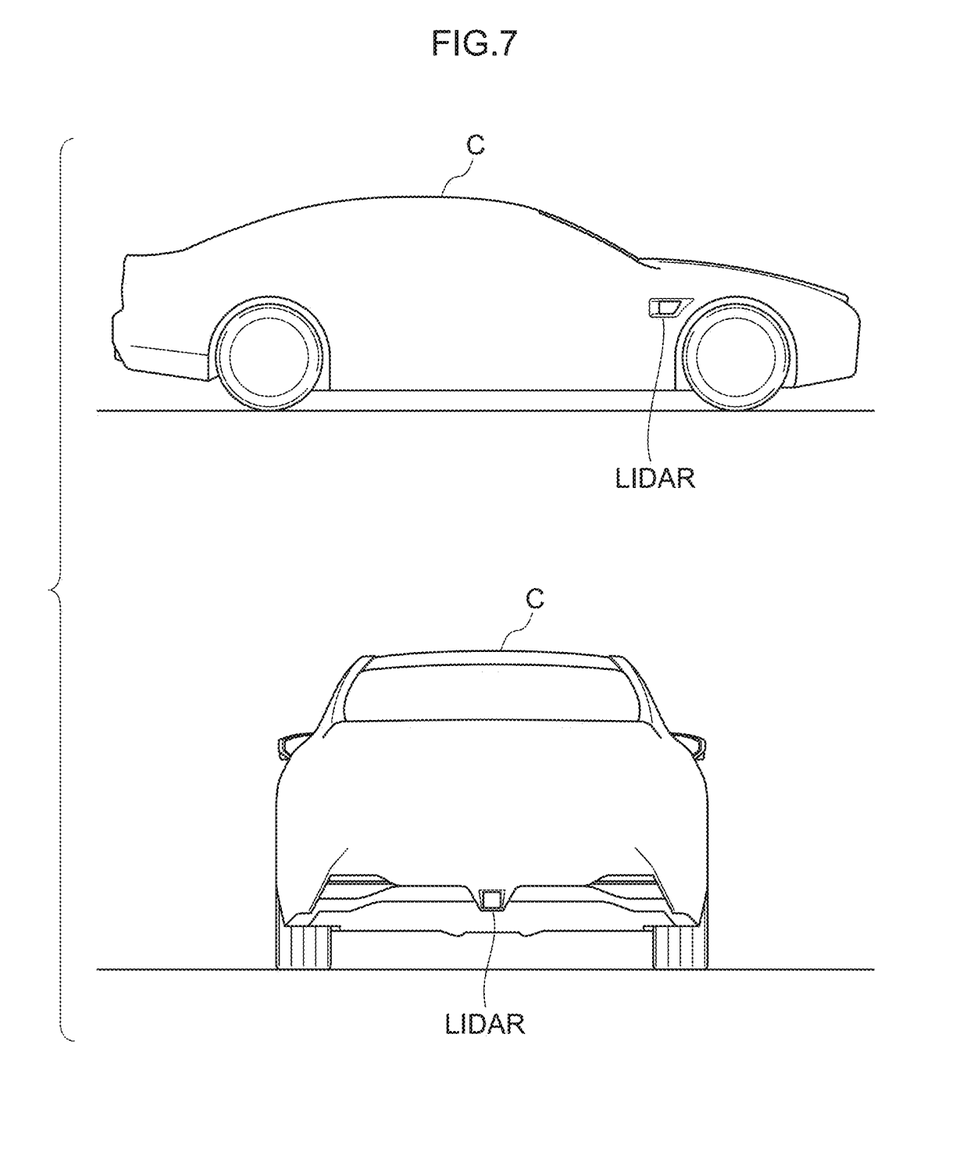
FIG. 7 is a diagram for explaining an example of sensors installed to an autonomous vehicle.

For example, an autonomous vehicle C such as that illustrated in FIG. 7 may be equipped with Light Detection and Ranging (LIDAR). The diagram in the upper part of FIG. 7 illustrates one side of the autonomous vehicle C, and the diagram in the lower part of FIG. 7 illustrates a rear side of the autonomous vehicle C. LIDAR may be installed to the autonomous vehicle C at the positions illustrated in FIG. 7. It would be difficult for this LIDAR to be detected by a transmission-type photoelectric sensor or an image sensor. Since LIDAR is an essential sensor for autonomous vehicles, it may be necessary to avoid the vicinity of the LIDAR during car-washing, and to ensure after car-washing that no water droplets have adhered to the LIDAR.

Moreover, it may be preferable to employ a different detergent for certain vehicle paints. Thus, car-washing that is suited to the vehicle paintwork cannot be executed simply by taking the external shape of the corresponding vehicle type into consideration.

In consideration of the above circumstances, an object of the present disclosure is to execute car-washing in an appropriate manner according to vehicle attribute information indicating an attribute of a car-washing target vehicle.

SUMMARY

In order to achieve the above object, a first aspect of the present disclosure is a carwash device including a reception section configured to receive vehicle attribute information indicating an attribute of a vehicle that is a car-washing target, a car-washing mode selection section configured to select a car-washing mode based on the vehicle attribute information, and a control section configured to drive a drive section for washing the vehicle such that the vehicle is washed in the car-washing mode selected by the car-washing mode selection section.

The carwash device of the first aspect of the present disclosure receives the vehicle attribute information indicating the car-washing target vehicle attribute. The carwash device selects a car-washing mode based on the vehicle attribute information. The carwash device then drives the drive section for washing the vehicle such that the vehicle is washed in the selected car-washing mode. This enables car-washing to be executed in an appropriate manner according to the vehicle attribute information indicating the car-washing target vehicle attribute. Specifically, there is no need to determine vehicle attributes (such as vehicle attribute information including the presence of any equipment) by image processing, thereby enabling reliable vehicle attribute information to be acquired, and enabling car-washing to be executed in an appropriate manner according to this information.

In a carwash device of a second aspect of the present disclosure, the vehicle attribute information includes at least one type of information selected from the group consisting of information indicating whether or not the vehicle is an autonomous vehicle, information indicating a shape of the vehicle, information indicating a paint on the vehicle, information indicating a coating on the vehicle, information indicating equipment of the vehicle, and information indicating robustness of the vehicle. The second aspect of the present disclosure enables car-washing to be executed according to either the information indicating whether or not the vehicle is an autonomous vehicle, the information indicating the vehicle shape, the information indicating the vehicle paint, the information indicating the vehicle coating, the information indicating the vehicle equipment, or the information indicating the vehicle robustness.

In a carwash device of a third aspect of the present disclosure, the vehicle attribute information includes information indicating whether or not the vehicle is an autonomous vehicle. In a case in which the vehicle is an autonomous vehicle, the car-washing mode selection section sets an autonomous vehicle-specific car-washing mode, this being a car-washing mode avoiding a vicinity of a sensor utilized during autonomous driving. The control section is configured to control the drive section such that the vehicle is washed in the autonomous vehicle-specific car-washing mode set by the car-washing mode selection section. The third aspect of the present disclosure enables car-washing that is appropriate for the autonomous vehicle to be executed.

In a carwash device of a fourth aspect of the present disclosure, the vehicle attribute information includes information indicating whether or not the vehicle is an autonomous vehicle. In a case in which the vehicle is an autonomous vehicle, the car-washing mode selection section sets an autonomous vehicle-specific car-washing mode, which is a car-washing mode reducing a brush rotation speed in a vicinity of a sensor utilized during autonomous driving. The control section is configured to control the drive section such that the vehicle is washed in the autonomous vehicle-specific car-washing mode set by the car-washing mode selection section. The fourth aspect of the present disclosure enables car-washing that is appropriate for the autonomous vehicle to be executed.

In a carwash device of a fifth aspect of the present disclosure, after controlling the drive section such that the vehicle is washed in the autonomous vehicle-specific car-washing mode set by the car-washing mode selection section, the control section is configured to output an instruction signal instructing to reduce sensor sensitivity to a vehicle control device installed to the vehicle. The fifth aspect of the present disclosure enables the autonomous vehicle to travel in an appropriate manner after car-washing has been executed on the autonomous vehicle. Specifically, the sensor sensitivity may improve dramatically after car-washing which might affect vehicle control, and so the sensor sensitivity is reduced in order to counter this.

In a carwash device of a sixth aspect of the present disclosure, the vehicle attribute information includes information indicating robustness of the vehicle. The car-washing mode selection section is configured to set a car-washing mode reducing at least one of a brush rotation speed, a brush contact force, or a water pressure for washing the vehicle based on the vehicle robustness included in the vehicle attribute information. The control section is configured to control the drive section such that the vehicle is washed in the car-washing mode set by the car-washing mode selection section. The sixth aspect of the present disclosure enables car-washing to be executed in an appropriate manner according to the vehicle robustness.

In a carwash device of a seventh aspect of the present disclosure, the vehicle attribute information includes information indicating a paint on the vehicle or information indicating a coating on the vehicle. The car-washing mode selection section is configured to set a car-washing mode including a type of detergent for washing the vehicle based on the information indicating the vehicle paint or the information indicating the vehicle coating included in the vehicle attribute information. The control section is configured to control the drive section such that the vehicle is washed in the car-washing mode set by the car-washing mode selection section. The seventh aspect of the present disclosure enables car-washing to be executed in an appropriate manner according to the vehicle paintwork.

In a carwash device of an eighth aspect of the present disclosure, the reception section is configured to additionally receive an image of the vehicle captured by a camera. The car-washing mode selection section is configured to set a car-washing mode including a type of detergent for washing the vehicle based on the vehicle image and the vehicle attribute information. The eighth aspect of the present disclosure enables a car-washing mode to be set in consideration of the vehicle attribute information for the vehicle as well as the captured image.

In a carwash device of a ninth aspect of the present disclosure, the reception section is configured to receive the vehicle attribute information through a management server configured to manage a car-washing system. If the vehicle attribute information is stored in the carwash device or the vehicle control device, a storage region of the carwash device or the vehicle control device might become overloaded. Thus, by storing the vehicle attribute information in the management server, the ninth aspect of the present disclosure enables car-washing to be executed in an appropriate manner according to the vehicle attribute without having to store the vehicle attribute information in the carwash device or the vehicle control device.

In a carwash device of a tenth aspect of the present disclosure, a vehicle control device installed to the vehicle outputs to the carwash device the vehicle attribute information or information indicating a manner of car-washing as input by an occupant of the vehicle. The car-washing mode selection section is configured to select the car-washing mode based on the vehicle attribute information or the information indicating the manner of car-washing. The tenth aspect of the present disclosure enables a car-washing mode to be set by being chosen by the occupant of the vehicle.

An eleventh aspect of the present disclosure is a car-washing system including the carwash device of any one of the first aspect to the tenth aspect, and a vehicle control device. Similarly to the first aspect, the eleventh aspect of the present disclosure enables car-washing to be executed in an appropriate manner according to the vehicle attribute information indicating the car-washing target vehicle attribute.

A twelfth aspect of the present disclosure is a car-washing method in which a computer executes processing including receiving vehicle attribute information indicating an attribute of a vehicle that is a car-washing target, selecting a car-washing mode based on the vehicle attribute information, and driving a drive section for washing the vehicle such that the vehicle is washed in the selected car-washing mode. Similarly to the first aspect, the twelfth aspect of the present disclosure enables car-washing to be executed in an appropriate manner according to the vehicle attribute information indicating the car-washing target vehicle attribute.

A thirteenth aspect of the present disclosure is a storage medium stored with a car-washing program for causing a computer to execute processing including receiving vehicle attribute information indicating an attribute of a vehicle that is a car-washing target, selecting a car-washing mode based on the vehicle attribute information, and driving a drive section for washing the vehicle such that the vehicle is washed in the selected car-washing mode. Similarly to the first aspect, the thirteenth aspect of the present disclosure enables car-washing to be executed in an appropriate manner according to the vehicle attribute information indicating the car-washing target vehicle attribute.

As described above, the present disclosure obtains an advantageous effect of enabling car-washing to be executed in an appropriate manner according to the vehicle attribute information indicating the car-washing target vehicle attribute.

DESCRIPTION OF EMBODIMENTS

Detailed explanation follows regarding an exemplary embodiment of the present disclosure, with reference to the drawings.

Vehicle Control System

Figure 1:
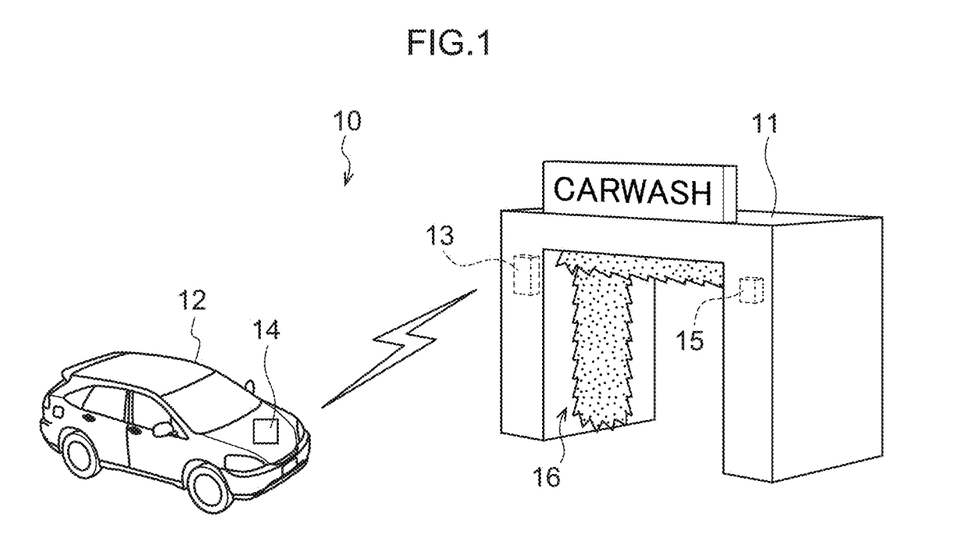
FIG. 1 is a diagram illustrating an example of a schematic configuration of a car-washing system according to an exemplary embodiment.

FIG. 1 is a diagram for explaining an overview of a car-washing system 10 according to the present exemplary embodiment. As illustrated in FIG. 1, the car-washing system 10 of the present exemplary embodiment includes a carwash unit 11 and a vehicle 12. The carwash unit 11 includes a carwash device 13, a drive section 15, and brushes 16. A vehicle control device 14 is installed to the vehicle 12. Note that the vehicle control device 14 is for example an electronic control unit (ECU). The carwash device 13 and the vehicle control device 14 are connected so as to be capable of communicating with each other.

The carwash device 13 of the car-washing system 10 of the present exemplary embodiment acquires vehicle attribute information indicating an attribute of the vehicle 12 from the vehicle control device 14, and executes car-washing of the vehicle 12 according to the vehicle attribute information. Specifically, car-washing of the vehicle 12 is executed by selecting a car-washing mode based on the vehicle attribute information, and by driving the drive section 15 such that the vehicle is washed in the selected car-washing mode. This enables the carwash device 13 to execute car-washing in an appropriate manner according to the vehicle attribute information provided from the vehicle 12.

Detailed explanation follows below.

Figure 2:
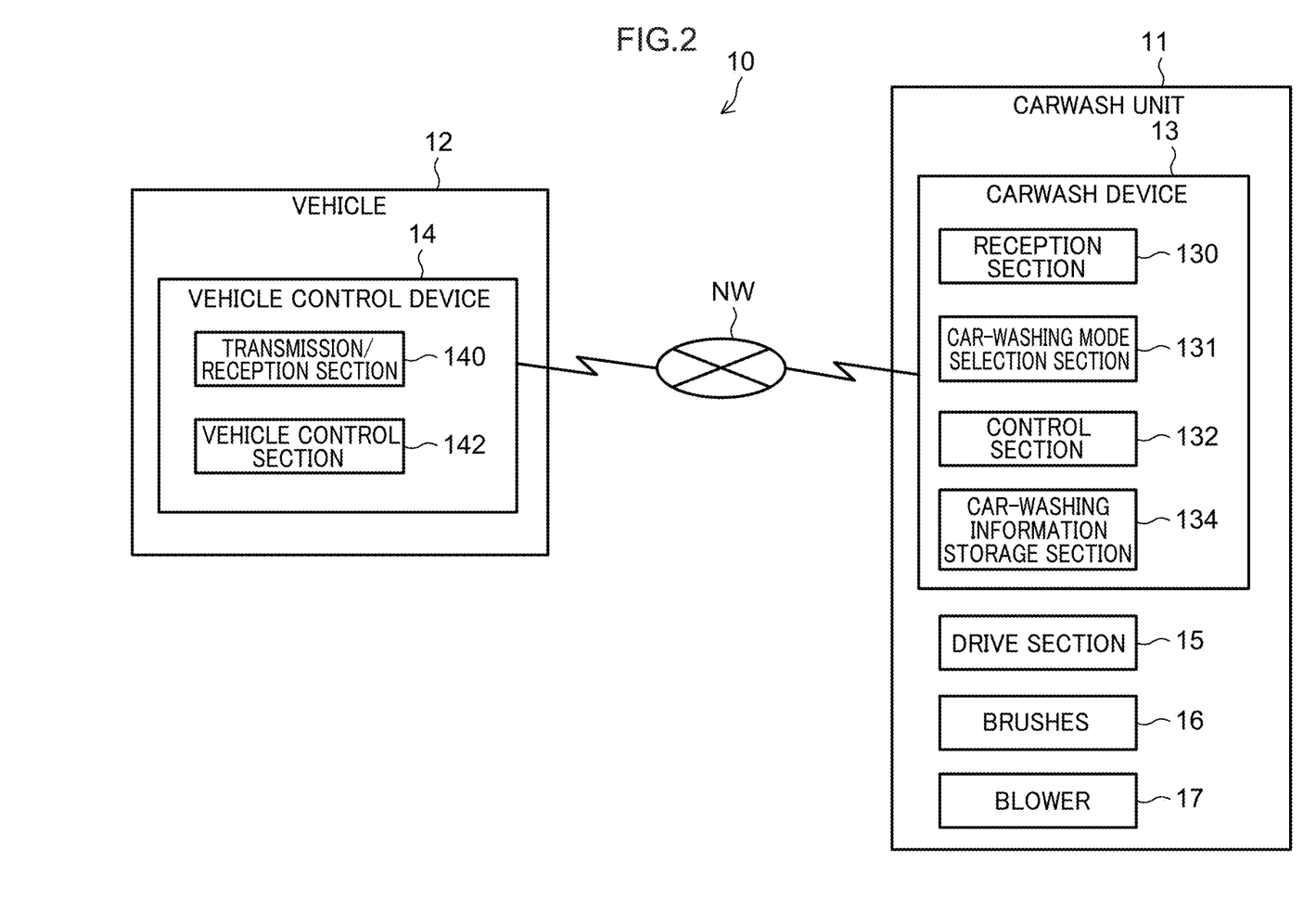
FIG. 2 is a block diagram illustrating an example of functional configuration of a car-washing system according to an exemplary embodiment.

FIG. 2 is a block diagram illustrating an example of functional configuration of the car-washing system 10 according to the present exemplary embodiment. As illustrated in FIG. 2, the car-washing system 10 includes the vehicle 12 and the carwash unit 11. The vehicle control device 14 included in the vehicle 12 includes a transmission/reception section 140 and a vehicle control section 142. The carwash unit 11 includes the carwash device 13, the drive section 15, the brushes 16, and a blower 17. The carwash device 13 included in the carwash unit 11 includes a reception section 130, a car-washing mode selection section 131, a control section 132, and a car-washing information storage section 134. The vehicle control device 14 and the carwash device 13 are connected so as to be capable of communicating with each other over a predetermined communication network NW.

Figure 3:
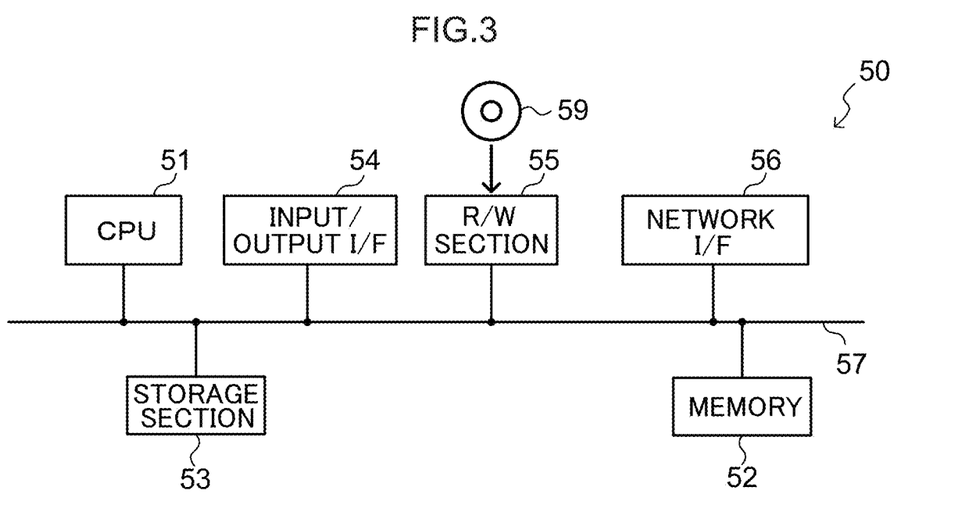
FIG. 3 is a diagram illustrating an example of a configuration of a computer that implements respective devices according to an exemplary embodiment.

The vehicle control device 14 and the carwash device 13 may for example be implemented by computer 50 such as that illustrated in FIG. 3. The computer 50 that implements the vehicle control device 14 and the carwash device 13 includes a central processing unit (CPU) 51, memory 52 serving as a temporary storage region, and a non-volatile storage section 53. The computer 50 also includes an input/output interface (I/F) 54 to which an input/output device and so on (not illustrated in the drawings) are connected, and a read/write (R/W) section 55 that controls reading and writing of data with respect to a recording medium 59. The computer 50 also includes a network I/F 56 that is connected to a network such as the internet. The CPU 51, the memory 52, the storage section 53, the input/output I/F 54, the R/W section 55, and the network I/F 56 are connected to each other through a bus 57.

The storage section 53 may be implemented by a hard disk drive (HDD), a solid state drive (SSD), flash memory, or the like. The storage section 53 serves as a storage medium that stores a program for causing the computer 50 to function. The CPU 51 reads the program from the storage section 53 and expands the program in the memory 52 to sequentially execute processes included in the program.

Next, explanation follows regarding operation of the car-washing system 10 of the present exemplary embodiment.

For example, the vehicle control device 14 initiates a car-washing mode in cases in which a distance between the vehicle 12 and the carwash unit 11 is a predetermined distance or less, and signals successively output by the carwash device 13 are received by the vehicle control device 14.

In such cases, the control section 132 of the carwash device 13 outputs a request signal to the vehicle control device 14 requesting to start car-washing of the vehicle 12.

The transmission/reception section 140 of the vehicle control device 14 receives the request signal transmitted from the carwash device 13. The vehicle control section 142 of the vehicle control device 14 then transmits vehicle attribute information indicating an attribute of the vehicle 12 to the carwash device 13 in response to the request signal. The vehicle attribute information is information including at least one type of information selected from the group consisting of information indicating whether or not the vehicle 12 is an autonomous vehicle, information indicating a shape of the vehicle 12, information indicating a paint on the vehicle 12, information indicating a coating on the vehicle 12, information indicating equipment of the vehicle 12, and information indicating robustness of the vehicle 12.

For example, the vehicle control device 14 acquires the vehicle attribute information from a storage section of a predetermined ECU (not illustrated in the drawings) of the vehicle 12. Alternatively, the vehicle control device 14 may acquire the vehicle attribute information for the vehicle 12 from a management server (not illustrated in the drawings) that holds vehicle attribute information for various vehicles. Note that this vehicle attribute information does not simply indicate the shape and so on of the vehicle 12, but may also for example include information with the same level of detail as the design specifications of the vehicle. The vehicle control device 14 transmits the vehicle attribute information to the carwash device 13.

Figure 4:
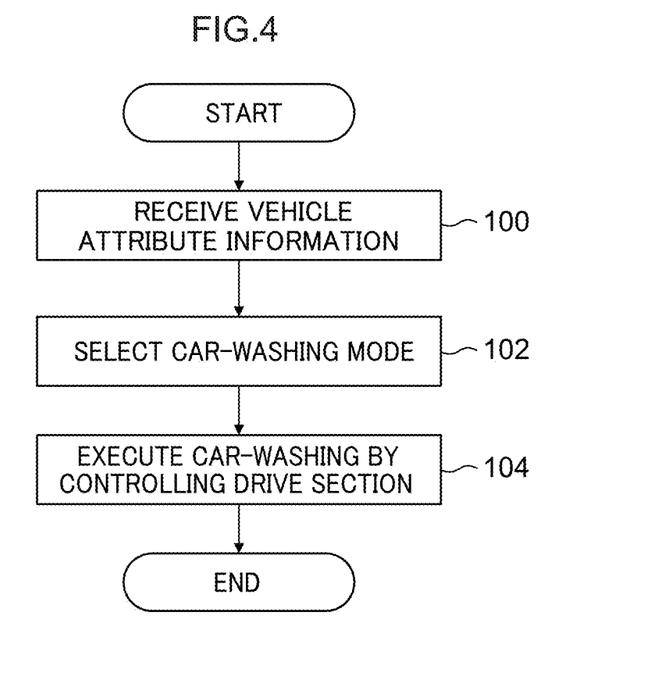
FIG. 4 is a flowchart illustrating an example of a flow of processing performed by a carwash device according to an exemplary embodiment.

When the vehicle attribute information is transmitted from the vehicle control device 14 to the carwash device 13, the carwash device 13 executes the flowchart illustrated in FIG. 4.

At step S100, the reception section 130 of the carwash device 13 receives the vehicle attribute information transmitted from the vehicle control device 14. The control section 132 of the carwash device 13 controls so as to drive the drive section 15 for washing the vehicle 12 based on this vehicle attribute information.

At step S102, the car-washing mode selection section 131 of the carwash device 13 selects a car-washing mode of the vehicle 12 based on the vehicle attribute information received at step S100.

Specifically, first, the control section 132 reads information relating to car-washing modes held in the car-washing information storage section 134.

Figure 5:
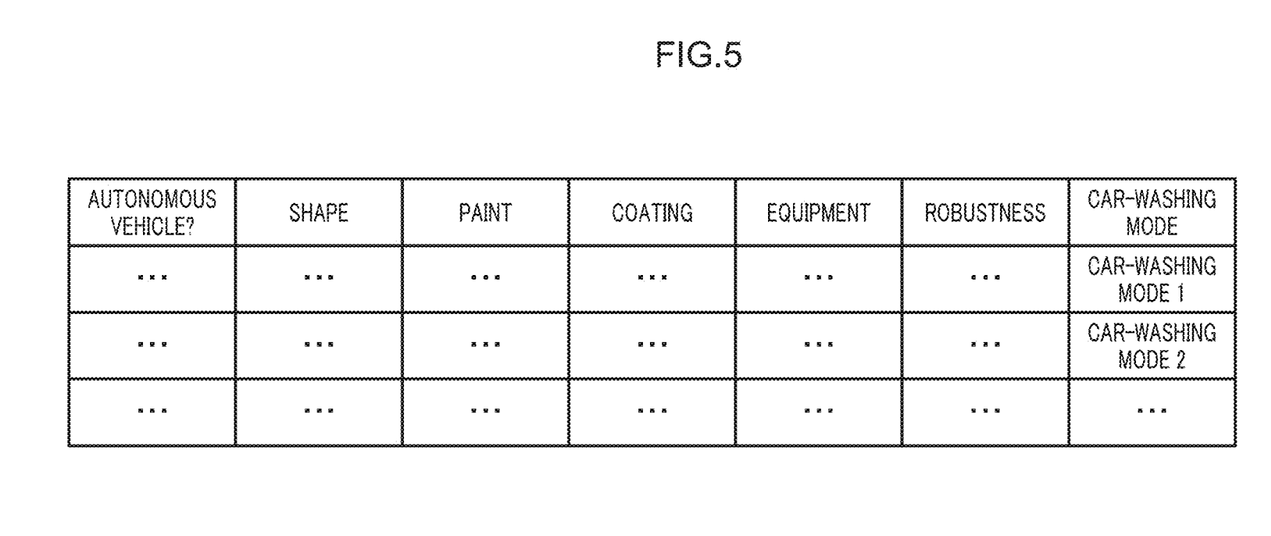
FIG. 5 is a diagram for explaining car-washing modes.

FIG. 5 illustrates an example of the car-washing mode-related information held in the car-washing information storage section 134. As illustrated in FIG. 5, vehicle attribute information and the car-washing modes are held associated with each other in the car-washing information storage section 134.

Thus, at step S102, the car-washing mode selection section 131 references the car-washing mode-related information held in the car-washing information storage section 134 in order to select a car-washing mode according to the vehicle attribute information.

For example, in cases in which the vehicle 12 is an autonomous vehicle, the car-washing mode selection section 131 may select as the car-washing mode an autonomous vehicle-specific car-washing mode, which is a car-washing mode avoiding vicinities of sensors utilized during autonomous driving. Alternatively, for example, in cases in which the vehicle 12 is an autonomous vehicle, the car-washing mode selection section 131 may set as the car-washing mode an autonomous vehicle-specific car-washing mode, which is a car-washing mode reducing a rotation speed of the brushes 16 in vicinities of the sensors utilized during autonomous driving. This is because, in cases in which the vehicle 12 that is the car-washing target is an autonomous vehicle, sensors (such as LIDAR) that are essential to the autonomous vehicle might be damaged when executing car-washing, and so a car-washing mode that reduces the rotation speed of the brushes 16 in the vicinities of such sensors is preferably adopted. Furthermore, the car-washing mode selection section 131 may set the car-washing mode such that air is blown onto the sensors from the blower 17 after car-washing of the vehicle 12 is complete.

Alternatively, for example, the car-washing mode selection section 131 may set a car-washing mode that reduces at least one of the rotation speed of the brushes 16, a contact force of the brushes 16, or a water pressure for washing the vehicle 12 based on the vehicle robustness included in the vehicle attribute information. This is because, in cases in which the car-washing target vehicle is less robust than other vehicles, the vehicle 12 might be damaged as a result of the car-washing, and so car-washing is preferably executed according to the vehicle robustness.

Alternatively, for example, the car-washing mode selection section 131 may set a car-washing mode that specifies a particular type of detergent for washing the vehicle based on the information indicating the vehicle paint or the information indicating the vehicle coating as included in the vehicle attribute information. This is because, for certain types of vehicle paint or coating, the paint or coating might peel off if car-washing is executed using a particular detergent, and so a car-washing mode is selected according to the vehicle paint or coating.

At step S104, the control section 132 of the carwash device 13 controls so as to drive the drive section 15 for washing the vehicle 12 so as to wash the vehicle 12 in the car-washing mode selected at step S102. Car-washing is thereby executed according to the vehicle attribute of the vehicle 12. Note that when this is performed, communication processing is performed between the carwash device 13 and the vehicle control device 14 such that the vehicle 12 enters the carwash unit 11. The brushes 16 are then actuated by driving the drive section 15 under the control of the control section 132 of the carwash device 13, and car-washing of the vehicle 12 is performed.

As described above, the carwash device of the car-washing system according to the present exemplary embodiment receives the vehicle attribute information indicating an attribute of the vehicle that is the car-washing target. The carwash device then selects a car-washing mode based on this vehicle attribute information. The carwash device drives the drive section for washing the vehicle such that the vehicle is washed in the selected car-washing mode. This enables car-washing to be executed in an appropriate manner according to the vehicle attribute information indicating the car-washing target vehicle attribute. Specifically, the vehicle can be washed automatically without having to perform vehicle attribute determination processing by image processing or the like. Specifically, there is no need to determine vehicle attributes (such as vehicle attribute information including the presence of equipment) by image processing, thereby enabling reliable vehicle attribute information to be acquired, and enabling car-washing to be executed in an appropriate manner according to this information.

The present disclosure is not limited to the above embodiment, and obviously various other modifications may be implemented within a range not departing from the spirit of the present disclosure.

For example, although an example has been described in the above exemplary embodiment in which the vehicle 12 is washed based on the vehicle attribute information transmitted from the vehicle control device 14, there is no limitation thereto. For example, in cases in which the car-washing target vehicle 12 is an autonomous vehicle, after controlling the drive section 15 such that the vehicle 12 is washed in the set autonomous vehicle-specific car-washing mode, the control section 132 of the carwash device 13 may then output an instruction signal instructing to reduce sensor sensitivity to the vehicle control device 14. This is because the sensor sensitivity is likely to increase after the autonomous vehicle has been washed due to any dirt that had adhered to the sensors being removed. In such cases, the difference in sensor sensitivity between the vehicle 12 prior to car-washing and the vehicle 12 after car-washing may negatively affect autonomous driving control. Thus, after car-washing of the vehicle 12 that is an autonomous vehicle is complete, the control section 132 of the carwash device 13 transmits an instruction signal to the vehicle control device 14 such that the vehicle control device 14 lowers the sensor sensitivity or performs a sensor masking function. On receiving this instruction signal, the vehicle control device 14 controls the respective sensors or ECUs so as to lower the sensor sensitivity or to perform a sensor masking function.

Moreover, although an example has been described in the above exemplary embodiment in which the vehicle 12 is washed based on the vehicle attribute information transmitted from the vehicle control device 14, there is no limitation thereto. For example, a car-washing mode may be selected based on an image of the vehicle 12 captured by a camera. For example, the reception section 130 of the carwash device 13 may additionally receive the image of the vehicle 12 captured by the camera. The car-washing mode selection section 131 of the carwash device 13 may then set a car-washing mode including a type of detergent for washing the vehicle based on the image of the vehicle 12 and on the vehicle attribute information. There are types of detergent that are best avoided for certain vehicle colors. Thus, for example, the car-washing mode selection section 131 of the carwash device 13 may identify the color of the vehicle 12 based on the image of the vehicle 12, and set a car-washing mode according to the color of the vehicle 12. Alternatively, for example, the car-washing mode selection section 131 of the carwash device 13 may estimate the level of dirt that has adhered to the vehicle 12 based on the color of the vehicle 12, and set a car-washing mode according to this estimation.

Figure 6:
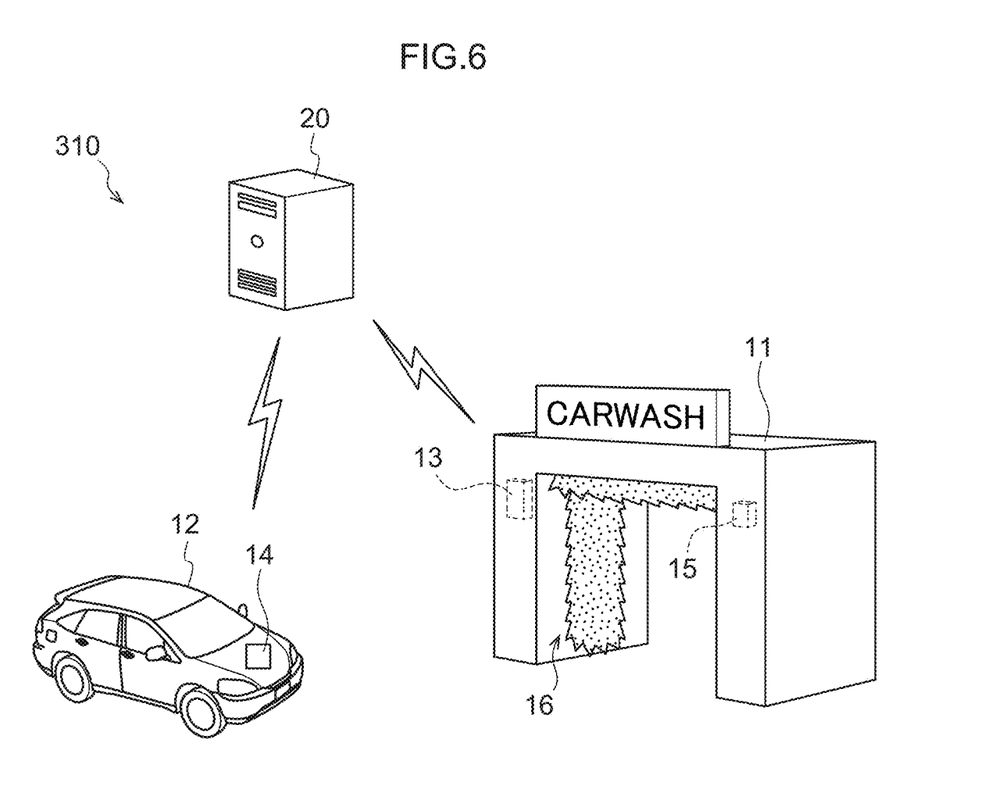
FIG. 6 is a diagram illustrating an example of a schematic configuration of a modified example of a car-washing system according to an exemplary embodiment.

Moreover, although an example has been described in the above exemplary embodiment in which information is directly exchanged between the vehicle control device 14 and the carwash device 13, there is no limitation thereto. For example, a configuration such as that illustrated in FIG. 6 may be applied. In such cases, as illustrated in FIG. 6, a car-washing system 310 may include a management server 20, and information may be exchanged between the vehicle control device 14 and the carwash device 13 via the management server 20. Moreover, some or all of the functionality of the carwash device 13 or the vehicle control device 14 may be implemented by the management server 20. In such cases, for example, the reception section 130 of the carwash device 13 may receive the vehicle attribute information through the management server 20 that manages the car-washing system 10.

Moreover, although an example has been described in the above exemplary embodiment in which the vehicle control device 14 acquires the vehicle attribute information from the storage section of the predetermined ECU (not illustrated in the drawings) of the vehicle 12 or from the management server, there is no limitation thereto. For example, the vehicle control device 14 may output to the carwash device 13 vehicle attribute information or information indicating a car-washing mode as input by an occupant of the vehicle 12, and the car-washing mode selection section 131 of the carwash device 13 may then select the car-washing mode based on this vehicle attribute information or information indicating the car-washing mode. In such cases, for example, a screen for inputting vehicle attribute information or a car-washing mode may be displayed on a touch panel display (not illustrated in the drawings) inside the vehicle 12, and the vehicle occupant may input the vehicle attribute information or car-washing mode by operating this display. The vehicle control device 14 then transmits this vehicle attribute information or car-washing mode input through the display to the carwash device 13, and the carwash device 13 selects a car-washing mode according to this vehicle attribute information or car-washing mode. This enables a car-washing mode to be set by being chosen by the occupant of the vehicle 12.

All publications, patent applications, and technical standards mentioned in this specification are herein incorporated by reference to the same extent as if each individual publication, patent application, or technical standard was specifically and individually indicated to be incorporated by reference.

The invention claimed is:

1. A carwash device, comprising:
a memory, and
a processor coupled to the memory, the processor being configured to:
receive vehicle attribute information indicating an attribute of a vehicle that is a car-washing target;
select a car-washing mode based on the vehicle attribute information; and
drive a drive section for washing the vehicle such that the vehicle is washed in the selected car-washing mode, wherein:
the vehicle attribute information includes information indicating whether or not the vehicle is an autonomous vehicle;
in a case in which the vehicle is an autonomous vehicle, the processor sets an autonomous vehicle-specific car-washing mode, which is the car-washing mode avoiding a vicinity of a sensor utilized during autonomous driving; and
the processor is configured to control the drive section such that the vehicle is washed in the set autonomous vehicle-specific car-washing mode.

2. The carwash device of claim 1, wherein:
the vehicle attribute information further includes at least one type of information selected from the group consisting of
information indicating a shape of the vehicle,
information indicating a paint on the vehicle,
information indicating a coating on the vehicle,
information indicating equipment of the vehicle, and
information indicating robustness of the vehicle.

3. The carwash device of claim 2, wherein:
the vehicle attribute information includes the information indicating robustness of the vehicle;
the processor is configured to set the car-washing mode reducing at least one of a brush rotation speed, a brush contact force, or a water pressure for washing the vehicle based on the vehicle robustness included in the vehicle attribute information; and
the processor is configured to control the drive section such that the vehicle is washed in the set car-washing mode.

4. The carwash device of claim 2, wherein:
the vehicle attribute information includes the information indicating the paint on the vehicle or the information indicating the coating on the vehicle;
the processor is configured to set the car-washing mode including a type of detergent for washing the vehicle based on the information indicating the vehicle paint or the information indicating the vehicle coating included in the vehicle attribute information; and
the processor is configured to control the drive section such that the vehicle is washed in the set car-washing mode.

5. The carwash device of claim 2, wherein
the processor is configured to receive the vehicle attribute information through a management server configured to manage a car-washing system.

6. The carwash device of claim 2, wherein:
a vehicle control device installed to the vehicle outputs, to the carwash device, the vehicle attribute information or information indicating a manner of car-washing as input by an occupant of the vehicle; and
the processor is configured to select the car-washing mode based on the vehicle attribute information or the information indicating the manner of car-washing.

7. A carwash device, comprising:
a memory, and
a processor coupled to the memory, the processor being configured to:
receive vehicle attribute information indicating an attribute of a vehicle that is a car-washing target;
select a car-washing mode based on the vehicle attribute information; and drive a drive section for washing the vehicle such that the vehicle is washed in the selected car-washing mode, wherein:

the vehicle attribute information includes information indicating whether or not the vehicle is an autonomous vehicle;

in a case in which the vehicle is an autonomous vehicle, the processor sets an autonomous vehicle-specific car-washing mode, which is the car-washing mode reducing a brush rotation speed in a vicinity of a sensor utilized during autonomous driving; and the processor is configured to control the drive section such that the vehicle is washed in the set autonomous vehicle-specific car-washing mode.

8. The carwash device of claim 1, wherein:

the processor is configured to additionally receive an image of the vehicle captured by a camera; and the processor is configured to set the car-washing mode including a type of detergent for washing the vehicle based on the vehicle image and the vehicle attribute information.

9. A car-washing system, comprising:
the carwash device of claim 1; and
a vehicle control device.

10. The carwash device of claim 1, wherein:

after controlling the drive section such that the vehicle is washed in the set autonomous vehicle-specific car-washing mode, the processor is configured to output an instruction signal instructing to reduce sensor sensitivity to a vehicle control device installed to the vehicle.

11. A car-washing method in which a processor executes processing comprising:

receiving vehicle attribute information indicating an attribute of a vehicle that is a car-washing target;

selecting a car-washing mode based on the vehicle attribute information; and driving a drive section for washing the vehicle such that the vehicle is washed in the selected car-washing mode, wherein the vehicle attribute information includes information indicating whether or not the vehicle is an autonomous vehicle;

in a case in which the vehicle is an autonomous vehicle, the processor executes further processing comprising
setting an autonomous vehicle-specific car-washing mode, which is the car-washing mode avoiding a vicinity of a sensor utilized during autonomous driving; and
controlling the drive section such that the vehicle is washed in the set autonomous vehicle-specific car-washing mode.

12. A non-transitory recording medium storing a car-washing program that is executable by a computer to perform a process comprising:

receiving vehicle attribute information indicating an attribute of a vehicle that is a car-washing target;

selecting a car-washing mode based on the vehicle attribute information; and driving a drive section for washing the vehicle such that the vehicle is washed in the selected car-washing mode, wherein the vehicle attribute information includes information indicating whether or not the vehicle is an autonomous vehicle;

in a case in which the vehicle is an autonomous vehicle, the process further comprises
setting an autonomous vehicle-specific car-washing mode, which is the car-washing mode avoiding a vicinity of a sensor utilized during autonomous driving; and
controlling the drive section such that the vehicle is washed in the set autonomous vehicle-specific car-washing mode.

13. A car-washing method in which a processor executes processing comprising:

receiving vehicle attribute information indicating an attribute of a vehicle that is a car-washing target;

selecting a car-washing mode based on the vehicle attribute information; and driving a drive section for washing the vehicle such that the vehicle is washed in the selected car-washing mode, wherein the vehicle attribute information includes information indicating whether or not the vehicle is an autonomous vehicle;

in a case in which the vehicle is an autonomous vehicle, the processor executes further processing comprising
setting an autonomous vehicle-specific car-washing mode, which is the car-washing mode reducing a brush rotation speed in a vicinity of a sensor utilized during autonomous driving; and
controlling the drive section such that the vehicle is washed in the set autonomous vehicle-specific car-washing mode.

14. A non-transitory recording medium storing a car-washing program that is executable by a computer to perform a process comprising:

receiving vehicle attribute information indicating an attribute of a vehicle that is a car-washing target;

selecting a car-washing mode based on the vehicle attribute information; and driving a drive section for washing the vehicle such that the vehicle is washed in the selected car-washing mode, wherein the vehicle attribute information includes information indicating whether or not the vehicle is an autonomous vehicle;

in a case in which the vehicle is an autonomous vehicle, the process further comprises
setting an autonomous vehicle-specific car-washing mode, which is the car-washing mode reducing a brush rotation speed in a vicinity of a sensor utilized during autonomous driving; and
controlling the drive section such that the vehicle is washed in the set autonomous vehicle-specific car-washing mode.

* * * * *